Jan. 29, 1935.    D. W. ACER ET AL    1,989,222
DISTRIBUTOR FOR POWDERED SUBSTANCES
Filed March 14, 1933    2 Sheets-Sheet 1
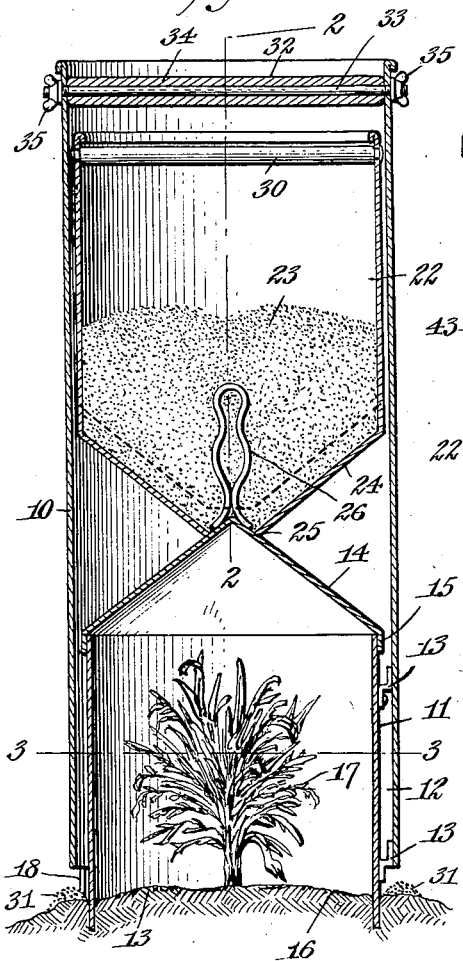
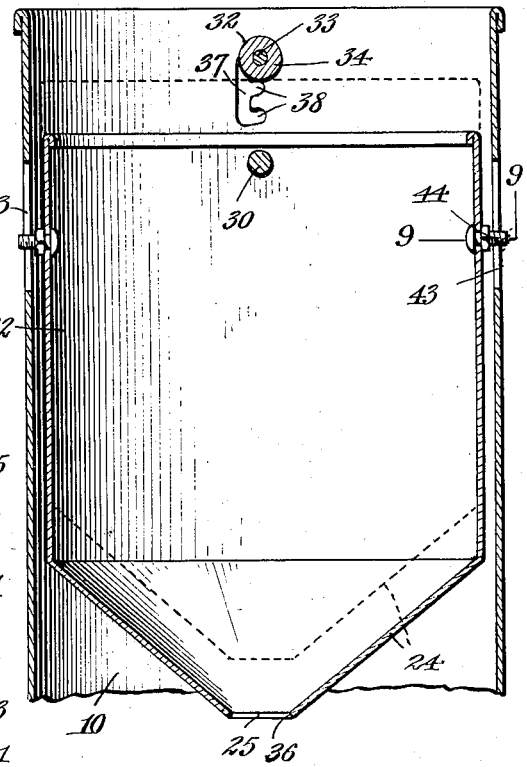
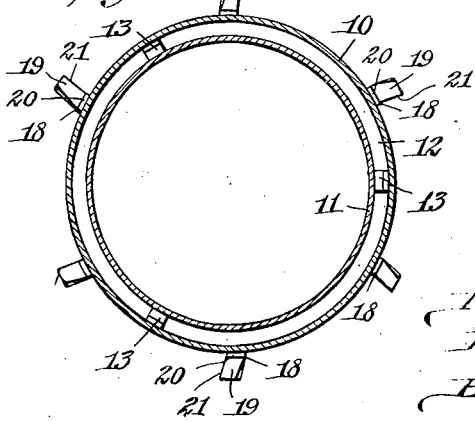
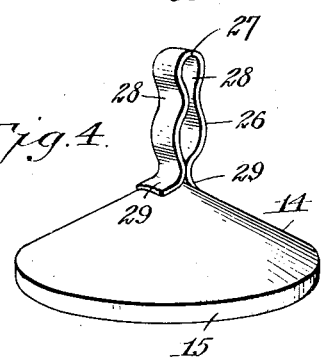
Donald W. Acer
Herbert A. Acer  } Inventors
By Emil Neuhart
      Attorney.

Jan. 29, 1935.　　D. W. ACER ET AL　　1,989,222
DISTRIBUTOR FOR POWDERED SUBSTANCES
Filed March 14, 1933　　2 Sheets-Sheet 2
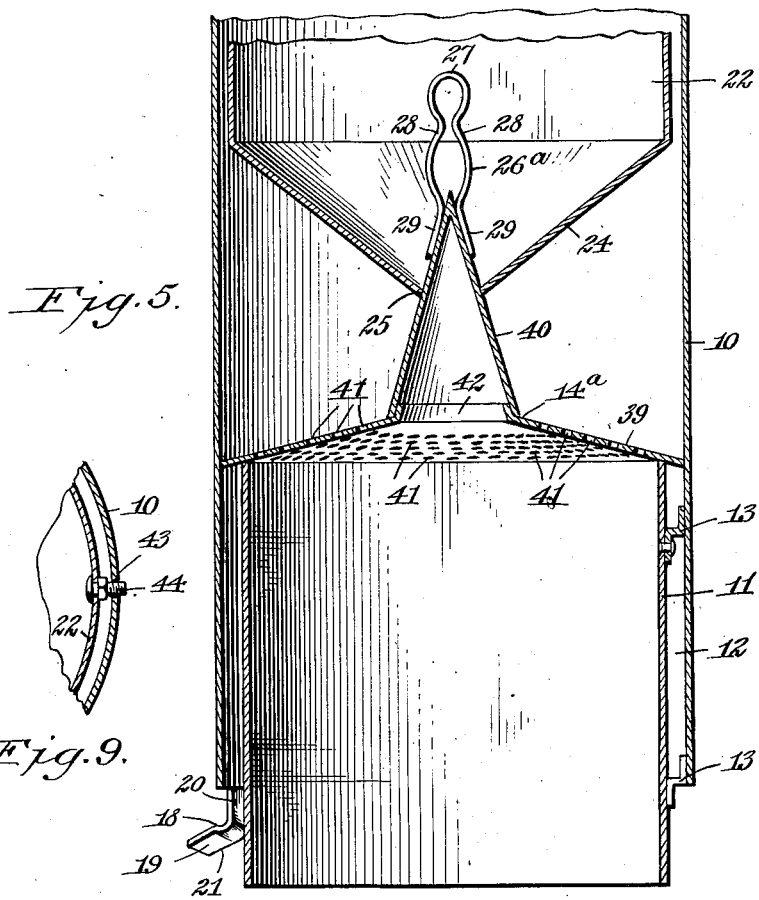
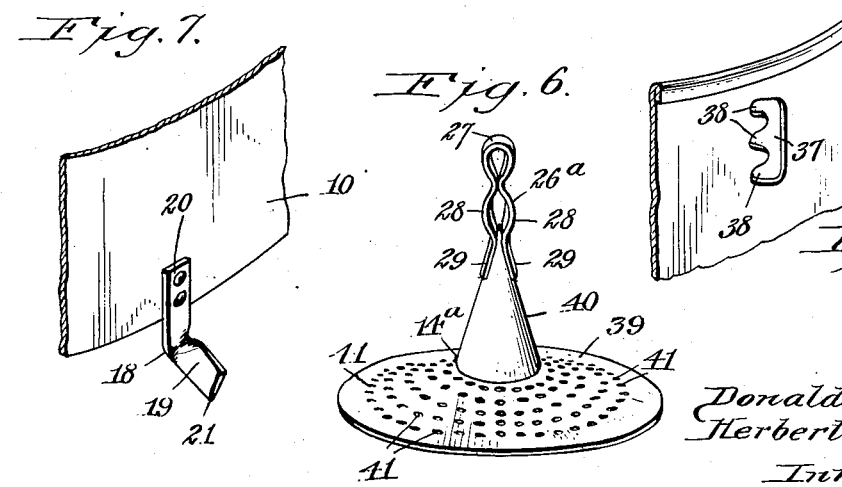
Donald W. Acer,
Herbert A. Acer,
Inventors.
By Emil Kuchert
Attorney.

Patented Jan. 29, 1935

1,989,222

UNITED STATES PATENT OFFICE 1,989,222

DISTRIBUTOR FOR POWDERED SUBSTANCES

Donald W. Acer and Herbert A. Acer, Medina, N. Y.; said Donald W. Acer assignor to said Herbert A. Acer Application March 14, 1933, Serial No. 660,666

20 Claims. (Cl. 111—1)

This invention relates to an improved distributor for powdered substances, and more particularly to what may be termed a convertible fertilizer and insecticide distributor.

Although distributors for applying powdered fertilizer around plants and distributing powdered insecticide onto plants are not broadly new, they are not in general use due to the fact that they are complicated, clog readily with the slightest moisture content in the powdered substances to be distributed, and in other respects fail to operate efficiently; and for this reason it is common practice to distribute powdered fertilizing material around plants by hand, and also when using powdered insecticide to distribute the same by hand onto plants.

It is the purpose of our invention to provide a distributor which can be employed for either purpose, by substitution of a single element.

A further object of our invention is the provision of a simple and effective distributor in which valves and other small flow-regulating elements are eliminated; thus assuring a free flow of the powdered material from its container under all conditions. Another object of our invention is to provide a distributor in which a container for the powdered material is included, and which material is maintained in the container and is bodily movable in contact with a fixed agitator forming part of a distributor element.

A still further object of our invention is to provide a distributor of the kind mentioned, having a distributor element and wherein said distributor element serves as the means to control the flow of the powdered material thereonto.

A still further object of our invention is to provide a distributor with a casing and a vertically movable container in said casing and in which the powdered material to be distributed is confined in bulk, said container being manually actuated and being associated with means to control the flow of the powdered material therefrom.

Still further objects of our invention are, to improve and simplify distributors of the type mentioned; to reduce the number of parts from those hereinbefore designed for such apparatus; and to provide simplified means for mixing powdered fertilizer, when distributed thereby, with the pulverized soil in which the plants are set.

A further object of our invention is to provide a simple, inexpensive, and effective distributor which is capable of being carried about and readily placed over plants, for the purpose of either distributing fertilizer in circular regions around the plants, or powdered insecticide onto the plants.

With these and other objects to appear hereinafter, the invention consists in the novel features of construction, and in the combination and arrangement of parts to be hereinafter described and more particularly pointed out in the subjoined claims.

In the drawings:

Fig. 1 is a central vertical section through a distributor constructed in accordance with our invention.

Fig. 2 is an enlarged vertical section taken on line 2—2, Fig. 1, the distributor head and material-agitating device extending upwardly therefrom into the material container or chamber being omitted, but showing a means for adjustably securing the main handle to the casing.

Fig. 3 is a transverse section taken on line 3—3, Fig. 1.

Fig. 4 is a detached perspective view of the distributor head employed for distributing powdered fertilizer in circular regions, showing also the agitating device extending upwardly therefrom.

Fig. 5 is an enlarged vertical section through the lower portion of a distributor and showing the distributor head in the form of an adapter, said distributor head being substituted for the head shown in Figs. 1 and 4 and being designed to distribute powdered insecticide onto plants.

Fig. 6 is a detached perspective view of the distributor head shown in Fig. 5.

Fig. 7 is a broken perspective view of a portion of the shell or casing of the apparatus, showing one of the mixing or cultivating devices applied to the inner side of said shell or casing.

Fig. 8 is a perspective view of a portion of the upper end of the shell or casing, showing one of the diametrically oppositely positioned adjuster slots thereon.

Fig. 9 is a horizontal section taken on line 9—9, Fig. 2.

Reference being had to the drawings in detail, 10 designates the shell or casing of the apparatus, which is preferably cylindrical in cross section and open at its upper and lower ends. Arranged coaxially within the lower portion of this shell or casing is a comparatively short sleeve 11, which is of somewhat smaller diameter than the shell or casing 10 and separated from the latter by an annular space 12. This sleeve 11 may be termed a distributor sleeve when using the apparatus as a fertilizer distributor, and a confining sleeve when using the same as an insecticide distributor. Like the shell or casing 10, it is open at opposite ends, its lower end terminating in preferred form in a plane beneath the lower edge of the said shell or casing. This sleeve is maintained in spaced relation to the shell or casing by brackets 13 riveted, welded, or otherwise secured to said short sleeve and to said outer shell or casing. Preferably these brackets are arranged in an upper and lower series evenly spaced around the sleeve 11, which may be termed a combined confining and distributing sleeve.

A distributor head or element 14 is removably applied to the top of the sleeve 11, it being of conical formation and having a depending flange 15 fitting around the upper open end of the sleeve 11 and being spaced from the shell or casing 10, as clearly shown in Fig. 1, this space forming the upper portion of the annular space 12. The inclination of the wall of the conical portion is such that powdered material delivered thereonto will travel downwardly and outwardly along the same in all radial directions, and drop through the annular space 12 onto the soil, designated by the numeral 16.

17 designates a plant set into the soil, the soil having been properly pulverized, or otherwise worked, preparatory to distributing fertilizer in a circular manner around the plant. Such treatment of the soil is usually resorted to preparatory to setting the plants therein, and after the plants are set, fertilizer in powdered form is distributed around each plant, and if desired, the fertilizer so distributed may be mixed with the soil. This is now accomplished by suitable cultivator tools or apparatus brought into operation after a field or area of plants has been completely fertilized, but for this purpose we apply cultivating elements 18 to the exterior of the outer shell or casing at its lower end. Each of these cultivating elements has a blade 19 extending outwardly from the outer shell or casing, and preferably such cultivating elements are in the form of metallic strips bent into angular formation to provide a securing arm 20 at right angles to the blade 19, which may be welded, riveted, or otherwise secured to the shell or casing 10. We prefer to pitch the blade laterally, as clearly shown in Figs. 5 and 7, and also to form the same with a sharp soil-entering edge 21, but this may not be found necessary when the soil is well pulverized. These cultivating elements may, however, be differently constructed and in a measure will accomplish the purpose desired. However, by positioning the apparatus over a plant, as shown in Fig. 1, the lower extremity of the sleeve usually becomes embedded in the pulverized soil under the weight of the apparatus, and consequently, the blades of the pulverizing elements, by reason of their pitch laterally, will freely enter the soil.

It is to be noted that the sleeve 11, by reason of its even diameter from end to end, and its being covered by the distributor head 14, forms a plant-receiving chamber, into which the plants extend upon setting the apparatus in position, and sufficient room is provided for the plant to prevent any portion of the sleeve or apparatus coming in contact with the foliage.

Arranged within the outer shell or casing and receiving support from the distributor 14 is a material chamber or container 22 in which the powdered fertilizer 23 or powdered insecticide, as the case may be, is placed. This chamber or container is also of cylindrical formation and slightly smaller than the outer shell or casing so that it may be moved upwardly and downwardly therein, and it has a hopper-like bottom 24 providing a downwardly and inwardly sloping wall in which an outlet or feed opening 25 is formed axially of said chamber or container, and through which the upper or apex portion of the conical distributor head extends. Said distributor head therefore not only serves as a support or rest for the material chamber or container, but also serves as a closure for the outlet or feed opening 25.

We provide an agitator 26 for the purpose of loosening the powdered material during the act of feeding the material from the container, and this agitator is applied to the apex of the distributor head 14 and extends upwardly therefrom. Consequently, when said distributor head is in position to close the outlet or feed opening 25 of the material chamber or container, said agitator extends well into the powdered material within said chamber or container, as clearly shown in Fig. 1. It is preferably formed of a strip of sheet material curved upon itself, as at 27, to provide two vertical members 28 which, to increase its agitating qualities, are curved inwardly and outwardly or in other words, transversely corrugated, to form irregular exterior surfaces, the lower ends of said members being bent outwardly, as at 29, so as to lie in contact with the distributor head to which they are welded, riveted, or otherwise permanently secured.

The material chamber or container 22 is provided with a handle 30 at its upper end, which is diametrically disposed and secured to the peripheral wall of said chamber or container at diametrically opposite points. A rod, such as shown in the drawings, may be employed for this purpose, and its ends may be reduced in diameter so as to provide shoulders which bear against the inner surface of the peripheral wall of the chamber or container, the reduced portion extending through said wall and being upset at their extremities to firmly secure the rod or handle in position. This rod or handle is utilized to lift the material chamber or container from the distributor head 14, which results in the outlet or feed opening 25 of said chamber or container being opened to allow the powdered fertilizer or insecticide to flow therethrough and travel downwardly and outwardly along the wall of the distributor head 14. At the same time the agitator 26 thoroughly loosens the powder within the chamber or container 22 directly above the outlet or feed opening by reason of this powder being shifted in position while in contact with the uneven or corrugated exterior of the agitator, thus assuring a free flow of the powdered material through the discharge or feed opening.

Since upon releasing the powdered material from the chamber or container 22 it is deposited directly upon the upper pointed or apex portion of the distributor head, this powder moves outwardly and downwardly along said distributor head in all radial directions. It is therefore evenly distributed over said head, and when reaching the perimeter thereof, drops over the flange 15 of said distributor head and through the annular space or passage 12, with the result that a quantity of this powder is delivered onto the soil and around the plant in circular or endless form, as indicated at 31, Fig. 1.

For convenience in carrying the apparatus from plant to plant, and for aiding in manipulating the material chamber or container, a handle 32 is applied diametrically to the shell or casing near its upper end. This handle is disposed above the handle 30 and is preferably parallel therewith. This handle 32 may be formed in any desired manner, but we prefer to employ a rod 33 having opposite ends screw-threaded and extending through the wall of the shell or casing 10 at diametrically opposite points, placing over said rod a wooden sleeve 34 having opposite ends in contact with the inner surface of the outer shell or casing. Thumb nuts 35 are applied to the screw-threaded ends of said rod and bear against the outer surface of the shell or casing 10. By thus applying a handle for the shell or casing 10, the latter will be maintained in true cylindrical formation without applying strain outwardly or inwardly thereto at the region of said handle.

The handle 32 for some purposes, may be maintained in a fixed position, as indicated in Fig. 1, and this is accomplished by passing the screw-threaded ends of the rod 33 through holes in the shell or casing 10 of a size conforming to the diameter of said rod. The quantity of the powdered material in the chamber or container 22 fed through the discharge or feed opening 25 is determined by the range of upward movement of said chamber or container, and the length of time that said chamber or container is maintained in elevated position. This is controlled by the operator grasping both handles 30 and 32, and pulling the handle 30 upwardly in contact with the handle 32, and immediately allowing the chamber or container 22 to gravitate. The extent to which the wall 36 of the discharge or feed opening 25 is moved away from the conical or sloping wall of the distributor head 14 determines the quantity of the powdered material being fed from the chamber or container 22 over a definite period of time, which can be accurately controlled by the operator as he acquires the ability to time the lifting of the chamber or container so as to bring the handle 30 thereof in contact with the main handle 32. Such action requires a fraction of a minute's time, and if the amount of the powdered fertilizer distributed into circular form on the soil is believed to be insufficient, the operator may cause a slower upward movement of the chamber or container 22, or in lieu thereof may momentarily hold the handle 30 in contact with the handle 32. However, to more positively determine the quantity of the powdered material to be delivered through the outlet or feed opening 25, we have arranged in the shell or casing 10, vertically-disposed slots 37 at diametrically opposite points thereof, with each slot provided with a vertical series of retainer notches 38 along one edge of the slot. When these slots are formed in the shell, the rod 33 of the handle 32 may be thrust through the slots and be positioned and clamped in any of the retainer notches 38; thus the handle 32 may be placed in differently spaced relations to the handle 30, with the result that when lifting the material-chamber or container 22, a shorter or longer range of movement is provided for the same, and since the distributor head, serving also as a means of closing the discharge or feed opening 25, has a fixed position, the extent to which the discharge or feed opening is opened may be varied. The retainer notches 38 arranged along one edge of each of the slots 37 serve as bolt holes and consequently in lieu of the slots with the notches, vertical series of bolt holes may be substituted therefor, in which event the slots 37 will be eliminated.

It will be apparent that when feeding powdered fertilizer, the entire bulk of fertilizing material is lifted with the chamber or container 22 and thus, regardless of the quantity of material within said chamber or container, a complete agitation of the material is assured during the feeding action, and possibility of clogging of the machine avoided, even though a certain degree of moisture content is embodied in the material.

We prefer to employ cultivating elements in somewhat closely spaced relation, six being shown in the drawings in a circular series, and after depositing the powdered fertilizer onto the soil and around a plant, and while the apparatus is still in position over the plant, the main handle 32 may be grasped with one or both hands and the shell or casing given a rotary movement, with the result that the cultivator blades previously entered, or partly entered, into the soil, will be moved through arcs of a circle, and thus mix the fertilizer with the soil. With six of such cultivating elements arranged in a circular series, comparatively little movement in a circular direction is required of the shell or casing to thoroughly mix all of the deposited fertilizer with the soil, especially since the blades of the cultivating elements are positioned in the same circular region as the circular region onto which the powdered fertilizer is deposited; and due to the transverse pitch given the cultivator blades 19, a thorough mixing of the fertilizer with the soil is assured. Thus when removing the apparatus from its position over a plant, a circular fertilized and cultivated region of soil will be exposed, in which the powdered fertilizer is thoroughly mixed. Consequently, even though fertilizing is accomplished in windy weather, no portion of the powdered fertilizer will be lost by reason of its being carried away with the wind.

In Fig. 1 we have shown the invention in the form of a fertilizer distributor whereby powdered fertilizer is delivered onto the soil in ring form around a plant, while in Fig. 5 we have shown the apparatus converted into an insecticide distributor by the mere substitution of a different form of distributor head, without in any manner changing any other parts of the apparatus.

It is to be noted that the combined distributing and confining sleeve is a fixed and immovable part of the apparatus, and that when distributing fertilizer it serves as a distributing sleeve, by reason of the fact that it maintains the powdered fertilizer delivered over the edge or flange of the distributor head 14 in circular form, and thus distributes it onto the soil in such form, whereas when the apparatus is used as an insecticide distributor, as shown in Fig. 5, this sleeve serves as a confining sleeve so as to prevent any of the powdered insecticide traveling downwardly outside of said sleeve.

In order to convert the apparatus into an insecticide distributor, it is merely necessary to replace the distributor head 14 with a distributor head 14$^a$, such as shown in Fig. 5. Removal of the distributor head 14 for this purpose is accomplished by removing the handle 32 from the shell or casing 10 and lifting the material chamber or container 22 out of the shell or casing, after which the agitator 26 extending upwardly from the distributor head may be taken hold of and the latter lifted from the permanently positioned sleeve 11. The distributor head 14$^a$ may then be inserted into the shell or casing 10 so as to rest upon the upper open end of the sleeve 11. When so positioned, the chamber or container 22 may be placed in position within the shell or casing, and the handle 32 applied to the latter.

It is to be noted that the diameter of the fertilizer distributor head 14 is somewhat smaller than the diameter of the shell or casing 10, while the diameter of the insecticide distributor head 14ª is of the same diameter as the interior diameter of the shell or casing so that the peripheral edge to this distributor head 14ª is in firm contact with the wall of said shell or casing and the marginal portion overhangs the annular space 12 between the shell or casing and the sleeve 11, thus positively closing the upper end of said annular space.

The distributor head 14ª is formed of a main part 39 and a secondary part 40, the main part comprising an annular member sloping downwardly and outwardly from its inner edge and being provided with numerous perforations 41 opening to the space within the short distributing and confining sleeve 11, that portion of the annular member overhanging the annular space 12 being imperforate. The secondary member is in the form of a cone rising axially from the main member and covering the opening 42 arranged centrally within said main member.

It is also to be noted that the angle or slope of the main member of the distributor head 14ª is considerably less than that of the distributor head 14, and this difference is necessitated by reason of the fact that a free and quick outward and downward flow of the fertilizing material is desired so that it is fed over the edge of the distributor head 14 in the shortest possible time, whereas in the case of the distributor head 14ª a slow outward movement of the powdered material is desired so that this material will be distributed through all of the perforations 41 in said head, and thus well cover a plant over which the apparatus may be set.

It is further to be noted, that by reason of the comparatively limited slope of the main member of the distributor head 14ª, said member could not serve as a closure for the discharge or feed opening 25 in the material chamber or container 22. Consequently, the conical secondary member 40 provides a sloping wall portion which rises abruptly from the sloping portion of the main member 39 of said distributor head, and this conical portion or member is of a diameter at a certain point in its length which will correspond to the diameter of the discharge or feed opening 25 and effectually close said opening while supporting the material-chamber or container.

To the apex of the conical secondary member of the distributor head 14ª, an agitator 26ª is secured, corresponding in formation to the agitator 26 on the distributor head 14.

The mode of operation in this converted apparatus is like that of the fertilizer distributor; upward movement of the material-chamber or container resulting in the opening of the discharge or feed opening 25, with the result that the material travels downwardly along the conical secondary member 40 of the distributor head 14ª, and from the latter passes onto the sloping wall of the main member 39 of said head; the slope being considerably less than that required for distributing powdered fertilizer in circular form, resulting in a slow outward movement of the powdered insecticide so that all perforations 41 in said head are supplied with the insecticide and deliver the same in somewhat finely distributed form onto the plant over which the apparatus is placed. In this instance the cultivator elements 18 are not put into use.

With a view of compelling the rotation of the material-chamber or container with the shell or casing while rotating the latter to cause a thorough mixing of the fertilizer with the soil, the shell or casing is provided at diametrically opposite points with vertical slots 43, and studs 44 are secured in the wall of the material-chamber or container 22 at diametrically opposite points and at radial alinement with the slots 43. These studs project outwardly from the material-chamber or container and extend through said slots so that upon movement of said chamber or container vertically, said studs have freedom of movement within said slots. Therefore, upon grasping the handle 32 of the shell or casing and rotating the same, the studs 44 being confined between the vertical walls of the slots 43 will cause rotary movement of said chamber or container in unison with the shell or casing.

It may here be stated that under the arrangement of parts described, the lower edge of the sleeve 11 is in a different plane than the lower edge of the shell or casing 10 which, under the method of distributing powdered fertilizer in circular formation, is desirable, and while we have illustrated the sleeve 11 as extending downwardly beyond the lower edge of the shell or casing 10, a reversal of this arrangement may be resorted to, under which the lower edge of the sleeve 11 may terminate in a plane above the lower edge of the shell or casing 10. Under such modified arrangement, the shell or casing 10 and sleeve 11 would have the lower ends terminating in different planes, as they do in the particular arrangement shown, but the lower portion of the shell or casing would be embedded in the soil instead of the lower portion of the sleeve 11.

We have, however, discovered that when the shell or casing is extended beyond the lower edge of the sleeve 11, as provided in fertilizer distributors of this general type, a perfect deposit of fertilizer is made along an annular region, but upon lowering of the shell or casing so as to close the feed opening therein, the air within the apparatus beneath the material-chamber or container is placed under pressure and causes the deposited fertilizer to be forced inwardly toward the plant and onto the same; whereas, when terminating the lower end of the shell or casing 10 in a plane above the lower edge of the sleeve 11, the sleeve becomes embedded in the soil, as do the cultivator blades, and a complete enclosure is provided for the plant. The fertilizer deposited along an annular region does not reach the lower edge of the outer shell or casing, and therefore space is assured at this point through which the air forced outwardly by the lowering of the material-chamber or container can pass freely without in any manner disturbing the deposit of fertilizer.

Having thus described our invention, what we claim is:

1. A distributor for powdered material, comprising a casing open at its upper and lower ends, a sleeve positioned in the lower portion of said casing separated from said casing by an intervening space, a distributor element at the upper end of said sleeve adapted to deliver powdered material into said annular space, and a material container having a feed opening normally closed by said distributor and movable to deliver material onto the latter to be distributed into said annular space.

2. A distributor for powdered material, comprising a casing open at its upper and lower ends, a sleeve positioned in the lower portion of said casing and terminating with its lower edge in a different plane than the lower edge of said casing, said sleeve being co-axially disposed within and immovably secured to said casing, a distributor element at the upper end of said sleeve adapted to deliver powdered material to a region determined by the wall of said sleeve, and a material-container supported by said distributor element and having a feed opening normally closed by said distributor element, said material-container being movable away from said distributor element to permit material from said container to be delivered onto said distributor element and by the latter be delivered to the region determined by said sleeve.

3. A distributor for powdered material, comprising a casing open at its upper and lower ends, an open-ended sleeve within the lower portion of said casing and permanently secured in spaced relation thereto, a distributor head insertable into said casing so as to rest against the upper end of said sleeve, and a material-container within the upper portion of said casing supported by said distributor head and having a feed opening closed by said distributor head, said material-container being arranged for vertical movement to and from said distributor head.

4. A distributor for powdered material, comprising a casing open at its upper and lower ends, an open-ended sleeve within the lower portion of said casing determining the region into which powdered material is to be distributed, a distributor element positioned over the upper end of said sleeve, and a material-container having a feed opening closed by said distributor element, said material-container and distributor element being relatively movable to effect the opening and closing of said feed opening.

5. A distributor for powdered material, comprising a cylindrical open-ended casing, a cylindrical open-ended sleeve within the lower portion of said casing and having its lower edge terminating in a different plane than the lower edge of said casing, said sleeve being permanently secured to said casing in annularly-spaced relation thereto, a downwardly and outwardly sloping distributor element closing the upper end of said sleeve and being of smaller diameter than said casing so as to be spaced therefrom, a material-container above said distributor element vertically movable in said casing and having a feed opening at its lower end closed by the central portion of said distributor element, and an agitator secured to said distributor element and extending upwardly into said material-container.

6. A distributor for powdered material, comprising an open-ended casing, means in the bottom of said casing providing an intervening space between the two through which powdered fertilizer is adapted to be delivered, a material-container within the upper portion of said casing having an opening in its lower end, and means between said material-container and said sleeve serving to normally close said opening and serve as a combined material distributor and feed control.

7. A distributor for powdered material, comprising an open-ended casing, means in the bottom of said casing providing an intervening space between the two through which powdered fertilizer is adapted to be delivered onto the soil beneath, a vertically-movable material-container within the upper portion of said casing, and stationary means between said material-container and said sleeve serving as a combined material distributor and feed control, said stationary means having an element extending into said material-container to serve as a material-agitator when vertically moving said material-container.

8. A distributor for powdered material, comprising an open-ended casing, means in the bottom of said casing defining the region to which powdered material is to be delivered, a vertically-movable material-container within the upper portion of said casing having a feed opening, and immovable means between said material-container and said region defining means for distributing material from said container and normally closing the feed opening thereof, and for controlling the feed of the material from said container under movement of the latter.

9. An apparatus for distributing powdered material, comprising an open-ended cylindrical casing, an open-ended cylindrical sleeve within the lower portion of said casing immovably positioned therein in annularly-spaced relation thereto, said sleeve terminating at its lower end in a plane beneath the lower edge of said casing, a conical distributor head removably applied to the upper end of said sleeve, an agitator rising from the apex of said conical distributor head and permanently secured thereto, a handle for said casing diametrically disposed in the upper end thereof, a material-container within said casing having a hopper-like bottom provided with an axial feed opening into which the apex portion of said conical distributor head extends, said agitator extending into the material within said container and said container having the wall of its feed opening in contact with the conical wall of said distributor head so as to support said material-container, and a handle diametrically disposed in the upper end of said material-container in spaced and parallel relation to the handle of said casing.

10. An apparatus for distributing powdered material, comprising an open-ended cylindrical casing, an open-ended sleeve within the lower portion of said casing immovably positioned therein in annularly-spaced relation thereto, said sleeve terminating at its lower end in a plane beneath the lower edge of said casing, a conical distributor head removably applied to the upper end of said sleeve and supported thereby, a vertically movable material-container within the upper portion of said casing receiving support from said conical distributor head and having a feed opening closed by the latter, a handle for said casing, a handle for said material-container arranged relative to said first-mentioned handle to permit both to be grasped to raise and lower said material-container, and cultivating elements applied to said casing in circular series and adapted to be brought into action upon rotative movement of said casing.

11. An apparatus for distributing powdered material, comprising an open-ended cylindrical casing, a regional distributing device within the lower portion of said casing rigidly connected to the latter, said casing and regional distributing device being in the form of a unitary structure; a vertically movable material-container within the upper portion of said casing having a hopper-like lower portion provided with an axial opening and receiving support from said regional distributing device, said regional distributing device serving to close said feed opening and open the same to any degree desired and cultivating means arranged in a circular series and secured to the lower end of said unitary structure, said cultivator elements including cultivator blades extending from said unitary structure and inclined at an angle to the horizontal.

12. A distributor for powdered material, comprising a casing open at its lower end, fixed distributing means within the lower portion of said casing including a sleeve extending beneath said casing, and a material-container supported by said distributing means having a feed opening normally closed by said distributing means and liftable therefrom to release material contained therein through said feed opening.

13. A distributor for powdered material, comprising a casing open at its lower end, means for distributing material disposed co-axially within the lower portion of said casing and projecting from the lower end thereof, said material distributing means including a sleeve and a distributor head removably applied to the upper end of said sleeve, and a material-container vertically movable within the upper portion of said casing and having a feed opening in its bottom closed by the distributor head.

14. A distributor for powdered material, comprising an open-ended casing, means in the bottom of said casing defining the region to which powdered material is to be delivered, a movable material container within the upper portion of said casing having a feed opening in its lower end, means for regulating the movement of said material-container, and immovable means between said material-container and region-defining means normally entered in said opening to close the same and to control the distribution of material from said container under movement of the latter.

15. A distributor for powdered material, comprising an open-ended casing, means in the bottom of said casing defining the region to which powdered material is to be delivered, a material-container within the upper portion of said casing vertically movable and having a feed opening, a distributor head removably applied to the upper end of said region-defining means for distributing material from said container under movement of the latter, said distributor head having a portion normally entered in said feed opening for controlling the feed of material from said container according to the degree of movement of the same, a handle for said casing vertically adjustable thereon, cultivator blades at the lower end of said casing and adapted to be operated under rotation of said casing, and means compelling said material-container to rotate with said casing.

16. A distributor for powdered material, comprising an open-ended casing, a handle for said casing diametrically disposed thereon, vertical slots in the wall of said casing at diametrically opposite points and near the upper end thereof, said slots having a series of spaced-apart notches opening thereinto for selective connection of said handle thereto, a vertically-movable material-container in the upper portion of said casing limited in its upward movement by the selective position of said handle and having a feed opening at its lower end, distributing means in the lower portion of said casing co-operating with said feed opening to control the feed of the material from said material-container, means at the lower end of said distributor to mix the distributed powdered material with the soil upon rotation of said casing, and co-acting means on said material-container and said casing to cause said material-container to rotate with said casing.

17. A distributor for powdered material, comprising a casing open at its lower end and having vertical slots at diametricaly opposite points, distributing means in the lower portion of said casing including a region-defining sleeve, a material-container in the upper portion of said casing having a feed opening closed by said distributing means and liftable therefrom to feed material onto said distributing means, cultivator blades secured to the lower end of said casing and extending outwardly therefrom, said cultivator blades being operative under rotation of said casing, and studs secured to said material-container and extending therefrom into the slots in said casing.

18. A distributor for powdered material, comprising an open-ended casing, means in the bottom of said casing defining the region to which powdered material is to be delivered, a movable material-container within the upper portion of said casing having a feed opening, immovable means between said material-container and said region-defining means having a portion co-acting with said feed opening for controlling the distribution of material from said container under movement of the latter, and cultivating elements secured to said casing formed of metallic strips bent at an angle between its ends to provide securing portions attached to said casing, and cultivator blades extending outwardly at an angle to said securing portions, said blades being inclined downwardly from said securing portion and pitched laterally.

19. A distributor for powdered material, comprising an open ended casing, a distributor element within said casing a distance from the upper end thereof, and a movable material-container within said casing above said distributor element delivering material under gravity to said distributor element, said container having a feed opening normally closed when the container is at rest and opened upon movement of the latter.

20. A distributor for powdered material, comprising a casing and a material-container relatively movable, a distributor within said casing beneath said container and separated from said casing by an intervening space, said material-container having a feed opening and said distributor serving to shut off the flow of material from said container when the latter and said casing are positioned in a definite relation and to feed material onto said distributor when said relation is changed under relative movement of said casing and container.

DONALD W. ACER.
HERBERT A. ACER.